(12) United States Patent
Mercier

(10) Patent No.: US 7,273,324 B2
(45) Date of Patent: Sep. 25, 2007

(54) ADJUSTABLE WEARABLE ERGONOMIC SPLIT KEYBOARD AND MOUSE

(76) Inventor: Cesar Mercier, 10110 Charterwood Dr. #G302, Houston, TX (US) 77070

(*) Notice: Subject to any disclaimer, the term of this patent is extended or adjusted under 35 U.S.C. 154(b) by 0 days.

(21) Appl. No.: 11/012,842

(22) Filed: Dec. 15, 2004

(65) Prior Publication Data
US 2005/0151673 A1    Jul. 14, 2005

Related U.S. Application Data

(60) Provisional application No. 60/529,727, filed on Dec. 15, 2003.

(51) Int. Cl.
*B41J 5/00*    (2006.01)

(52) U.S. Cl. .............. 400/489; 400/492; 400/663; 400/472; 400/715

(58) Field of Classification Search .......... 400/489, 400/492, 663, 715, 472, 666; *G06F 3/023, G06F 3/02*
See application file for complete search history.

(56) References Cited

U.S. PATENT DOCUMENTS

| | | | |
|---|---|---|---|
| 4,597,681 A * | 7/1986 | Hodges | 400/488 |
| 5,034,602 A * | 7/1991 | Garcia et al. | 250/227.22 |
| 5,613,786 A * | 3/1997 | Howell et al. | 400/489 |
| 5,796,354 A * | 8/1998 | Cartabiano et al. | 341/22 |
| 6,097,374 A * | 8/2000 | Howard | 345/168 |
| 6,184,804 B1 * | 2/2001 | Harrison | 341/22 |
| 6,984,081 B1 * | 1/2006 | Goldstein et al. | 400/492 |

FOREIGN PATENT DOCUMENTS

JP    411003160 A  *  1/1999

* cited by examiner

*Primary Examiner*—Judy Nguyen
*Assistant Examiner*—Matthew Marini

(57) ABSTRACT

An adjustable wearable ergonomic split keyboard and mouse data input device is provided that includes two hand modules. Data and command input keys are provided in each module and arranged on fingerlike components which are attached to a palm support structure. Each key mounted on top of a fingerlike component is generally adjustable to the operator's wish and may be locked at a preferred position. A thumb section, located adjacent to the operator forefinger position, comprises a thumb support structure, a pointing device and a relatively flat area which may include the spacebar key or a group of command keys. The palm support is shaped with angles and curves which provide counter pressure points to the palm. Straps and arm support components are optionally attached to the keyboards for wearability.

17 Claims, 18 Drawing Sheets

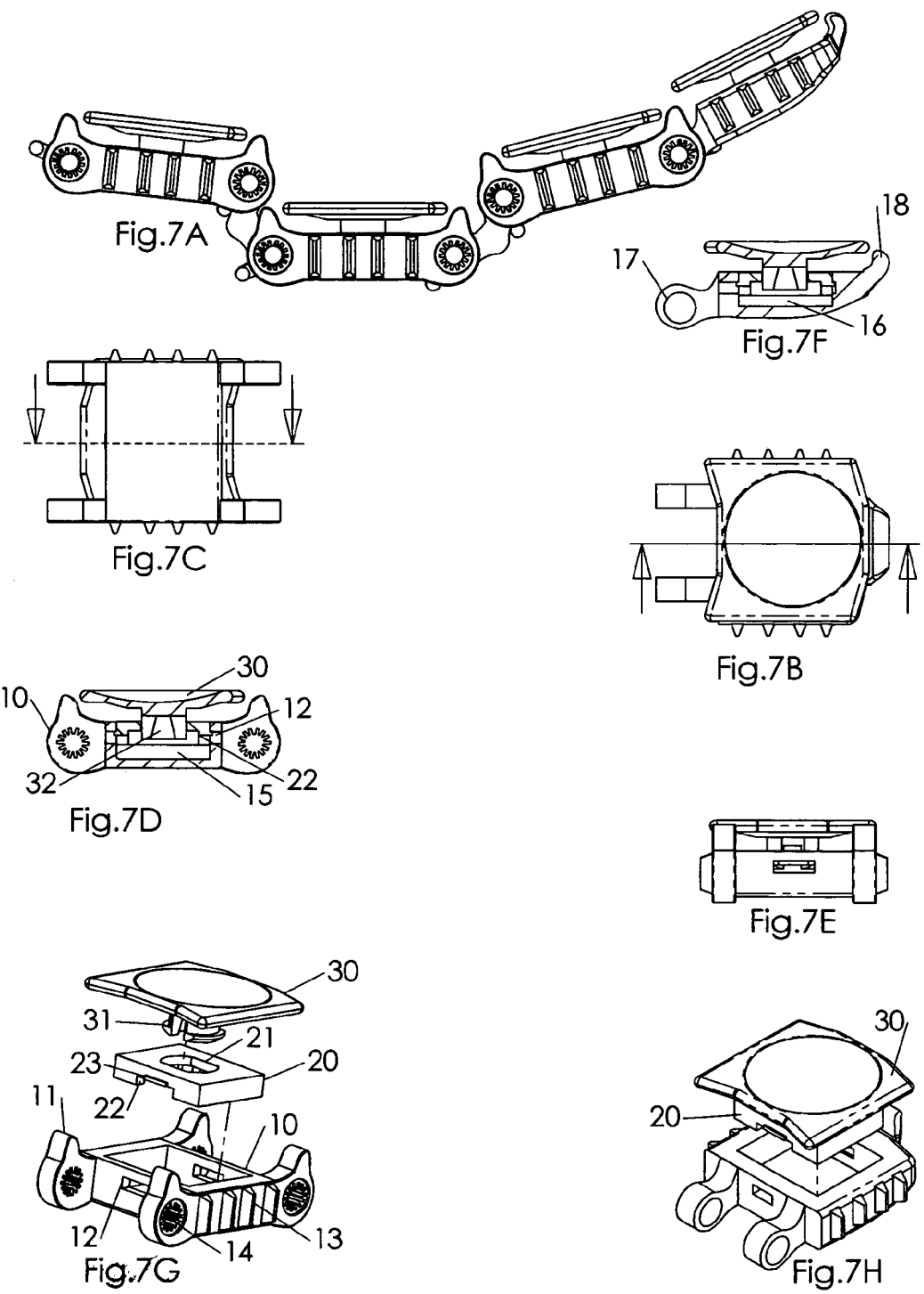

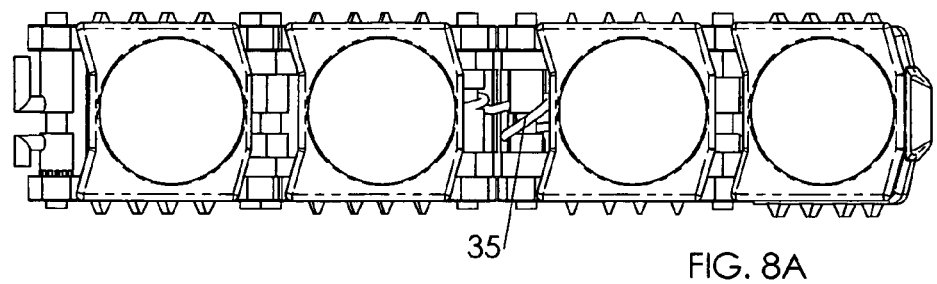
FIG. 8A
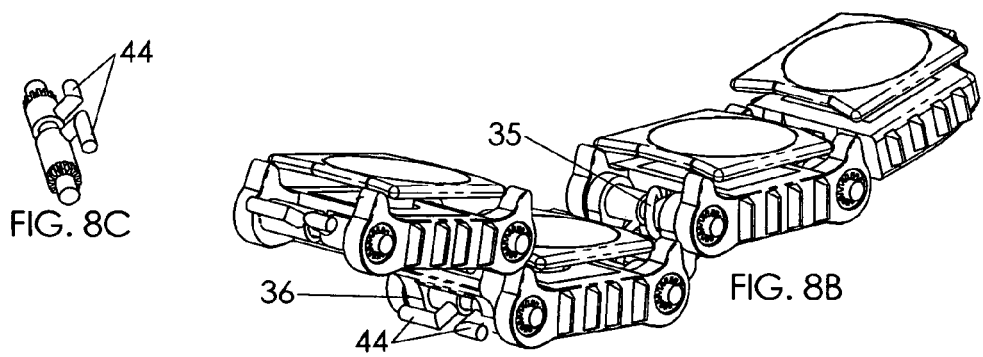
FIG. 8C
FIG. 8B
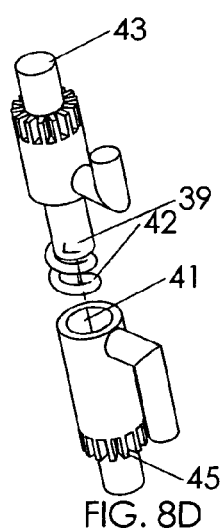
FIG. 8D
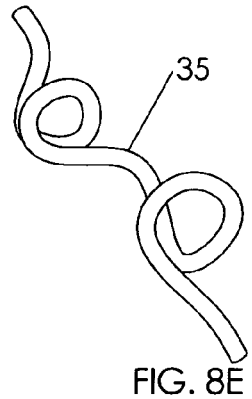
FIG. 8E
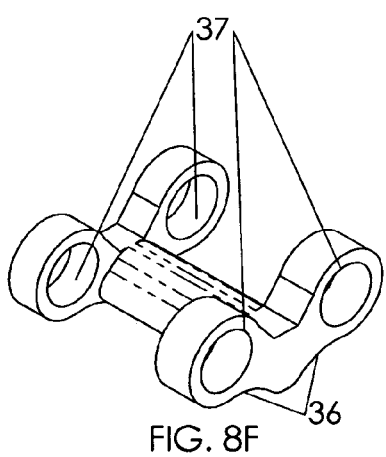
FIG. 8F

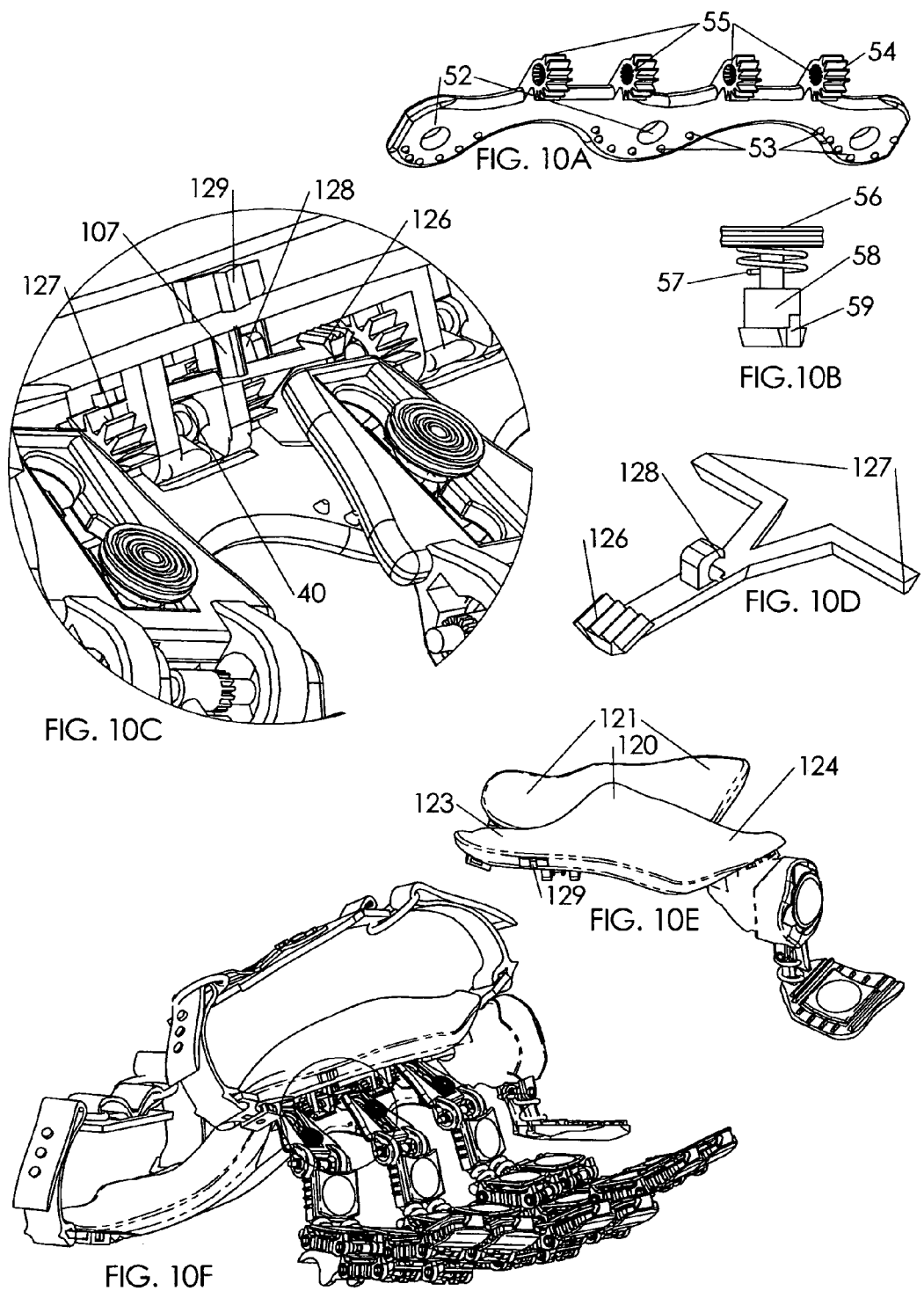

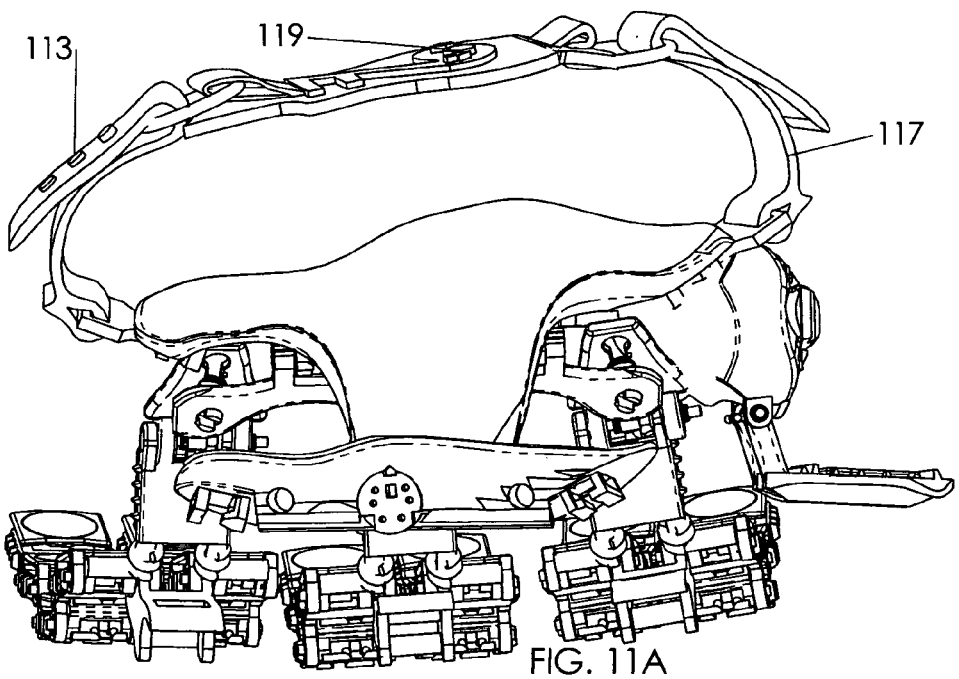
FIG. 11A
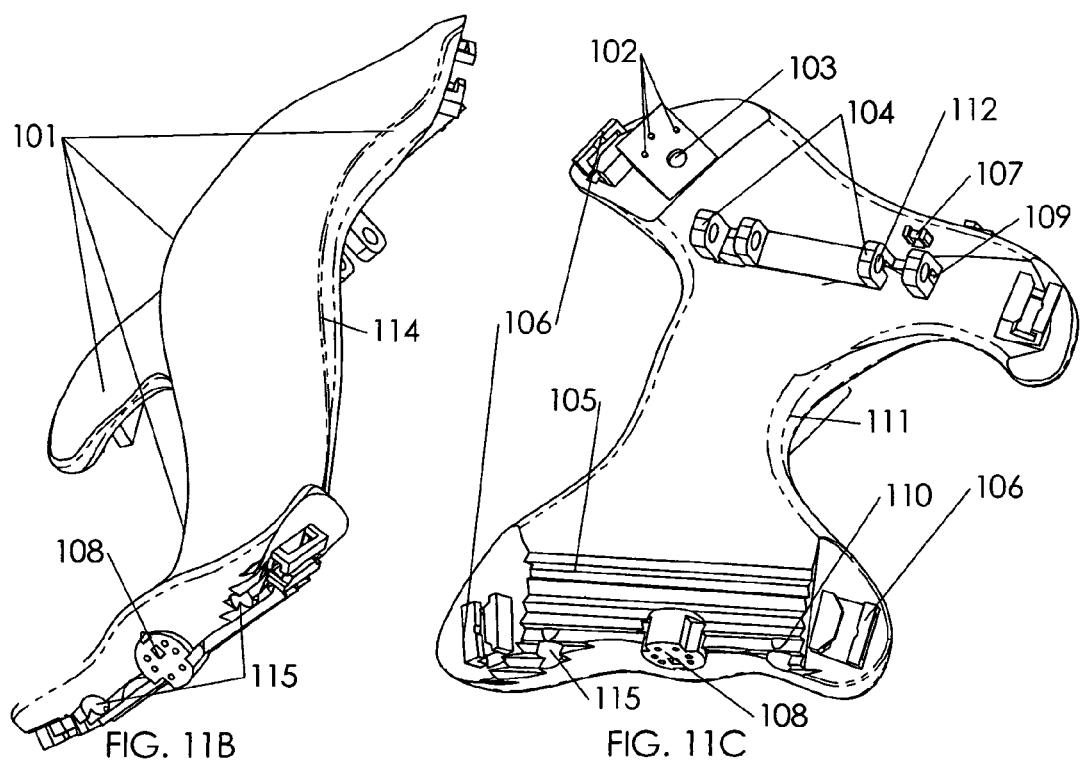
FIG. 11B
FIG. 11C

ADJUSTABLE WEARABLE ERGONOMIC SPLIT KEYBOARD AND MOUSE

"This application claims benefit to No. 60/529,727 filed Dec. 15, 2003."

FIELD OF THE INVENTION

The invention relates generally to an adjustable wearable ergonomic split keyboard/mouse device suitable for use as data input means for information processing systems such as desktops, tablet PCs, laptops and wearable computers. This invention may be connected to a computing system by data communication cables or wirelessly. More importantly, this invention focuses on design issues related to ergonomics which permit users to use the keyboard/mouse in a standard fashion while suiting the user's anatomy.

BACKGROUND OF THE INVENTION

Using keyboards extensively as the preferred input devices for data processing motivated me to develop an improved design of keyboards that better adapts to the human anatomy. Standard keyboards are typically flat, large and the operator has to adapt to the key arrangements. After using such a keyboard for many hours a day, it can become a health problem leading to a loss of productivity.

Efforts have been made to solve this problem in U.S. Pat. No. 4,042,777. The user operates they keyboard by pressing keys simultaneously just like playing the piano. The use of such a keyboard requires a well-trained user in order to type a sentence. Another two-hand ergonomic keyboard is disclosed in U.S. Pat. No. 5,178,477. The keyboard is operated by a slight finger movement. Each side of the keyboard also contains a hand and palm support. Due to a large number of keys assigned to the thumb, only a well-trained user can use the keyboard. Other keyboards are traditionally flat or slightly curved leaving little to no room for customization to the user's anatomy.

SUMMARY OF THE INVENTION

It is an objective of this invention to offer an improved ergonomic wearable keyboard and mouse which adapts to the anatomy of an operator's hand. Almost no additional training is required since the key layouts are standards to QWERTY or DVORAK.

Moreover, it is an objective of the invention to make available a compact and lightweight wearable ergonomic keyboard and mouse which is suitable for use with computing devices.

It is a purpose of the invention to provide an ergonomic wearable keyboard which facilitates its use in a sightless way. This makes the keyboard suitable for use while the operator concentrates on something else. This invention also facilitates the use of a wearable ergonomic keyboard by a blind person since the keyboard is already attached to their hands.

The main goal of this invention is to provide a means to allow easy adaptation regardless of the operator's hand or finger sizes.

A palm support is attached to the fingerlike components in a manner that provides guides for the fingers, whereas the keys are already set in columns. The sets of keys can be adjusted to be reached by the fingers, without stretching and while the palm rests on the palm support. This allows the operator to operate a computing device without hand or arm movement.

The operator can customize the keys millimeters from their fingertips in a relaxed manner. In other words, the keys adjust to the fingers not the fingers adjusting to the keys; this provides a lazy finger effect. A palm support also helps the fingers to remain in their naturally relaxed position.

Comfort is a state of mind, not a scientifically preset position. There are guidelines to avoid injuries while typing with a standard keyboard; however, this keyboard/mouse allows the operator to type regardless of their arm position.

The advantage of having the keys that are adjustable to the anatomy of the operator's hand helps with carpal tunnel syndrome, contrary to the conventional flat keyboard. Plus, the operator does not need to remain in one position while typing. This will greatly help with backaches and cramps.

BRIEF DESCRIPTION OF THE DRAWINGS

In the following, an embodiment of the invention is described with reference to drawings in which:

(FIG. 7A) is a side view of a fingerlike component.

(FIG. 7B) is a top view of a fingertip-like key unit.

(FIG. 7C) is a bottom view of a fingerlike key unit.

(FIG. 7D) is a sectional view of a key unit.

(FIG. 7E) is a front view of a fingerlike key unit.

(FIG. 7F) is a sectional view of a fingertip-like key unit.

(FIG. 7G) is an exploded view of a key unit.

(FIG. 7H) is an exploded view of a fingertip-like key unit.

(FIG. 8A) is a top view of a fingerlike component.

(FIG. 8B) is an isometric view of a fingerlike component.

(FIG. 8C) is an isometric view of a self-lock-lever-gear unit.

(FIG. 8D) is an exploded view of a self-lock-lever-gear unit.

(FIG. 8E) is side view of a double spring component.

(FIG. 9F) is an isometric view of a key joint.

(FIG. 10A) is an isometric view of a support bar for the fingerlike support units.

(FIG. 10B) is a side view of a spring-knob.

(FIG. 10C) is a detailed view of the support gears and the lever locking mechanism.

(FIG. 10D) is an isometric view of a release component.

(FIG. 10E) is an upper front view of the palm support and the thumb support section.

(FIG. 10F) is a left front view of the right side keyboard.

(FIG. 11A) is a back view of the left side keyboard.

(FIG. 11B) is an isometric top view of the palm support.

(FIG. 11C) is a bottom view of the palm support.

DETAILED DESCRIPTION OF THE INVENTION

Figure 4A:
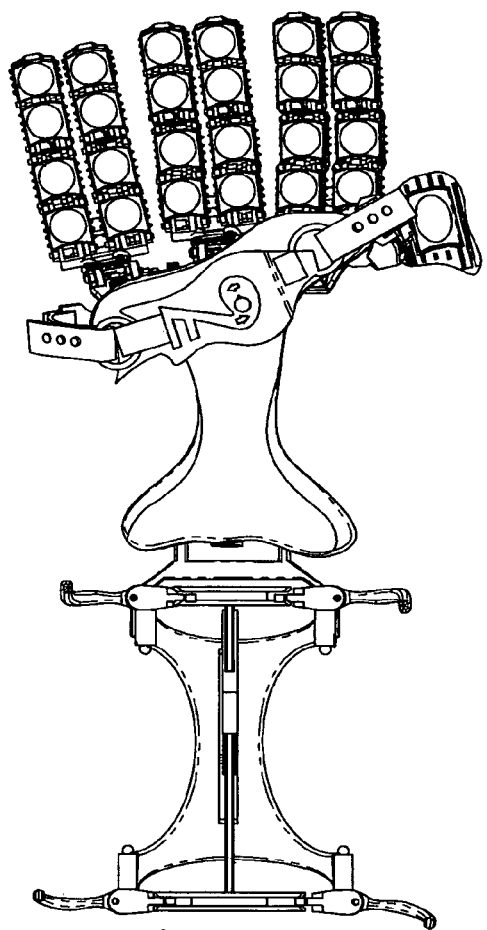
(FIG. 4A) is a top view of the left side keyboard attached to an arm support unit.
Figure 4B:
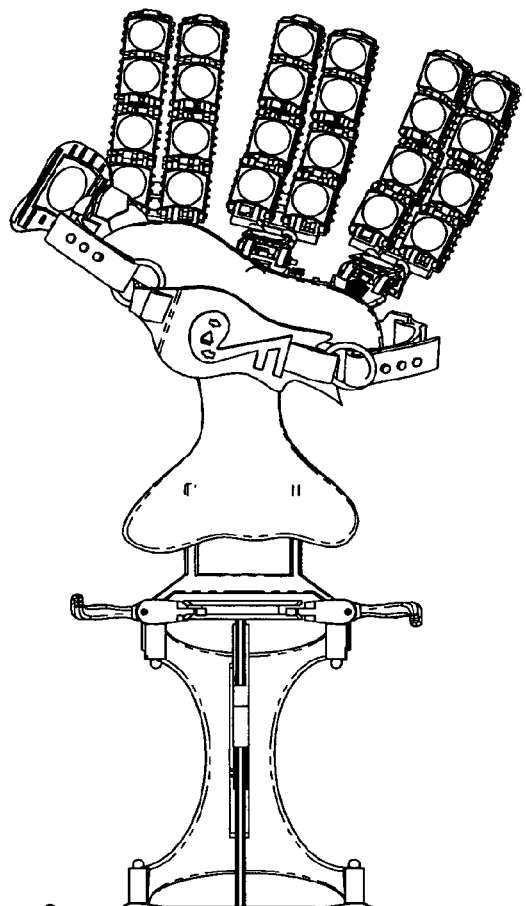
(FIG. 4B) is a top view of the right side keyboard attached to an arm support unit.
Figure 16:
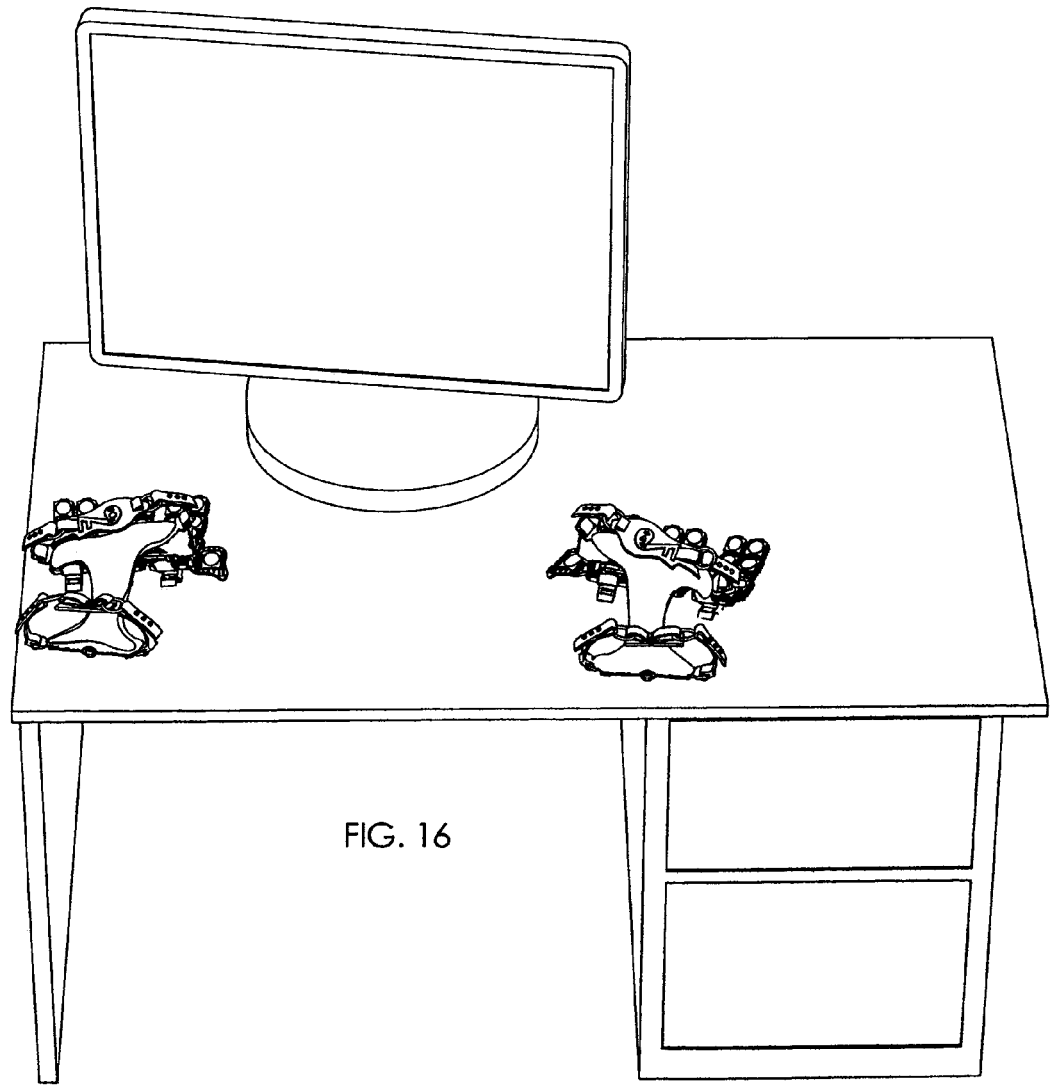
(FIG. 16) is an isometric view of both sides of the keyboard on a desk with a computer.

This invention discloses an adjustable wearable ergonomic split keyboard/mouse design (FIG. 4A and FIG. 4B) built to fit a variety of hand sizes (small, medium, or large). Such a design works because it allows the operator to customize, spread or retract every component of the keyboard/mouse. Also, this keyboard/mouse is wearable, or it can sit on a desk (FIG. 16) during usage. The design generally splits a keyboard and a mouse in half to be operated with two hands while maintaining the standard QWERTY or DVORAK key layouts. Extra multimedia and programmable keys (119) are located on the straps as in FIG. 1. As a result, this keyboard/mouse has more keys than a standard keyboard. The straps are the preferred location for the keys that are normally used seldom.

A support unit is provided for the palm, thumb and arm in order to allow the operator to use the keyboard/mouse in a relaxed manner, whether sitting down or walking. FIG. 11B represents the palm support component. It allows the operator to freely move his or her fingers while typing. Extra materials are stripped off (111 and 114) the palm support to allow it to be as lightweight as possible. The palm support component has curves and angles that are designed to ergonomically fit the anatomy of a human palm. Counter pressure points (101, 121, 123 and 124) are found on the palm support, neutralizing the pressure from the hand of the operator. Angle 120 gives the operator the feeling of a thumb massaging the center of the palm. Angle 120 further helps the palm to remain in a natural and relaxed manner rather than flat; it also helps the hand in position. The palm support component also houses the keyboard circuitry, battery and light source to light the keys. FIG. 11C is a bottom view of the palm support. Anti-friction bumps (105) are located at the bottom of the palm support to keep your hands from slipping while resting your hands on the table to type. A hook (106) is located at each corner of the palm support, as in FIG. 11C. The hooks are designed to allow two types of straps: one that snaps in, and is released on the sides, as in 117 (FIG. 11A). Another way allows you to wrap a string-like strap in the hooks. Two holes, located behind the palm support (115), are used to attach the arm support unit. The operator would simply slide the forklift-like component 134 (FIG. 13A) or 169 (FIG. 14D) into the holes (115) to secure the keyboard to the arm holder, as in FIG. 3B. The release button 110 (FIG. 1C) is used to detach the palm support from the arm support. A PS2 or USB cable may be used to attach the keyboard to the computer by connecting it to item 108 (FIG. 11C). A release mechanism (FIG. 10D) is attached to the palm support via item 107 (FIG. 11C). A button with a spring (FIG. 10B) is inserted into item 62 and item 103 (FIG. 11C) to secure the thumb section to the palm support. More than one hole, as in item 62 (FIG. 12A) may be used to allow the mouse section to go in and out for small or large hands. The left palm support is generally a mirror of the right palm support.

Figure 12A:
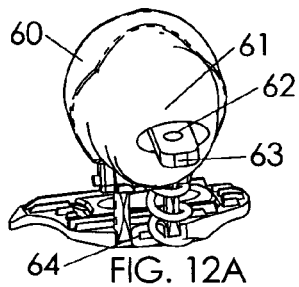
(FIG. 12A) is a back view of the thumb section.
Figure 12B:
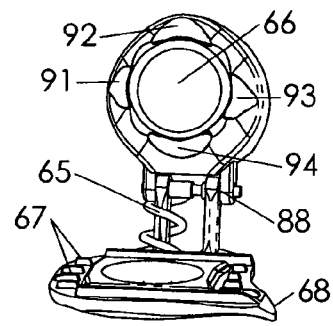
(FIG. 12B) is a front view of the right thumb section.
Figure 12C:
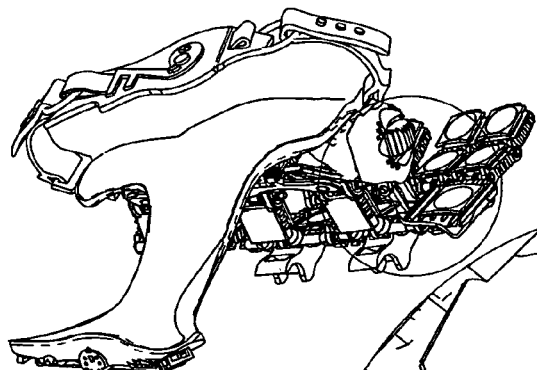
(FIG. 12C) is an upper back view of the left side keyboard.
Figure 12E:
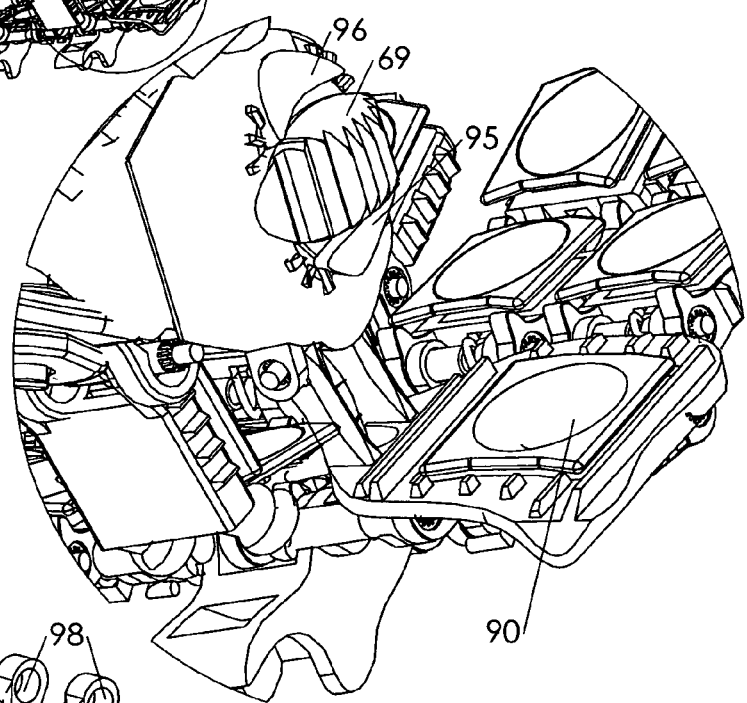
(FIG. 12E) is a detailed view of the thumb section of the left side keyboard.
Figure 12D:
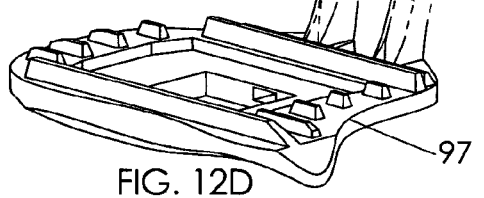
(FIG. 12D) is an isometric view of the thumb support base.

The right thumb support (FIG. 12B) is comprised of command keys (90-94), a curser pointing device (66) and a support unit for the thumb (FIG. 12D). The thumb support also contains anti-friction bumps, as in item 67 (FIG. 12B) to prevent slippage. The thumb support is further shaped, as in item 97 (FIG. 12D) for comfort. The thumb support (FIG. 12D) has two hooks (99) that are attached to the mouse casing, as in item 60 (FIG. 12A). The operator can use their thumb to close or open the thumb support. The thumb support rotates and hangs at the mouse casing. A bump, as in item 89 (FIG. 12D) on the thumb support clasps with another bump (88) from the mouse casing allowing the thumb support to remain closed, as in FIG. 5C or FIG. 5E. A command key (preferably the spacebar, 90) is mounted on top of the thumb support. The circuitry cable, as in item 65 (FIG. 12B) travels from inside the mouse casing (60) through a hole (64) in the thumb support. A Self-lock-lever-gear unit (FIG. 8C) is inserted through the mouse casing and the holes (98) in the thumb support. A spring may be used to provide downward force to keep the thumb support in an open position while the bars, as in item 44 (FIG. 8C) stop the thumb support at a desired distance. A flexible rubber, as in item 61 (FIG. 12A) may be used in the back of the mouse casing shielding the circuitry cables to the command keys in the thumb section. The left mouse is identical to the right; however, a mouse scroll, as in item 69 (FIG. 12E) may be located in between two command keys (preferably right mouse and left mouse keys, 95 and 96).

Figure 6A:
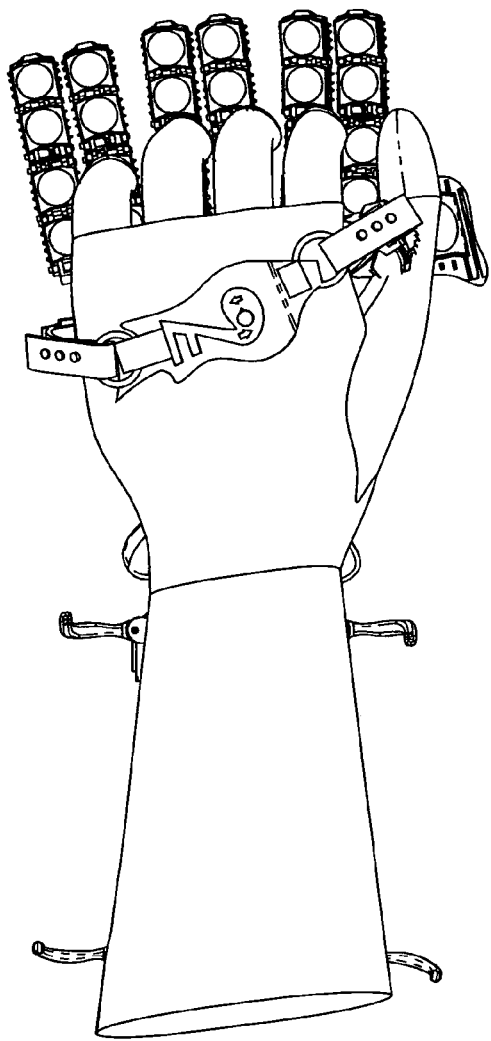
(FIG. 6A) is a top view of a left hand wearing the keyboard.
Figure 6B:
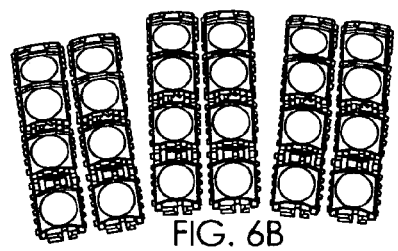
(FIG. 6B) is a top view of fingerlike components.

The keyboard keys are generally comprised of three pairs of fingerlike components (FIG. 6B). The fingerlike components are identical to each other and are generally comprised of four command key units. The key units are attached to each other (FIG. 7A). The last key unit is modified to look like a fingertip (FIG. 7B). The other three key units are identical and are comprised of a key base (10) a base cover (20), and a key top (30) as in FIG. 7G. FIG. 7D is a sectional view of the three components in place. The key base has four raised corners (11) as a way to protect the key top. The key bases also have anti-friction bumps (13) on both sides, helping the operator to move the key base units easily. A self-lock-lever-gear unit (FIG. 8C) is inserted inside of gear 14 (FIG. 7G) and locks in place. The key base has two holes (12) that allow the circuitry cables to be placed through. The same holes are being used to lock the key cover (23) in place. The key unit base cover also has a hole (22) allowing the circuitry cables to be placed through. Another hole (21) is located on the surface of the base key cover allowing the key top to move up and down. Item 21 is also not a perfect circle to ensure that the key will not turn around. A spring is mounted inside of the key top (32) and on top of a circuitry for the key (15), as in FIG. 7D to push the keys up. The key top is shaped to channel finger travel. The surface of the key top has a circular indentation providing maximum contact with the fingertip. The bottom of the key extends out allowing the key top to go up and down through the base cover (20). A head (31) prevents the key top from falling out of the key unit. A spring is mounted in a hole inside of the extension of the key top allowing it to go up after being pressed.

The first key unit is attached to a key joint unit (FIG. 8F) using a self-lock-lever-gear unit that goes through the hole in the key base (14) and the key joint component (37). The position or angle of the key joint component is determined by the hook (44) of the self-lock-lever-gear. Each key is attached to each other in the same manner. The operator can simply use two fingers to press on the edges (43) of the self-lock-lever-gear unit and twist the key unit then release them at the desired location. The fingertip component is modified (FIG. 7F), whereas a bump (18) is placed in front of the key top for protection to the key and allows it to look like a fingertip. The fingertip-like unit is connected directly to the other three key units (FIG. 7A). A spring, as in item 35 (FIG. 8E) is used to swing the key units apart while item 44 stops the key units at the desired location.

Figure 1:
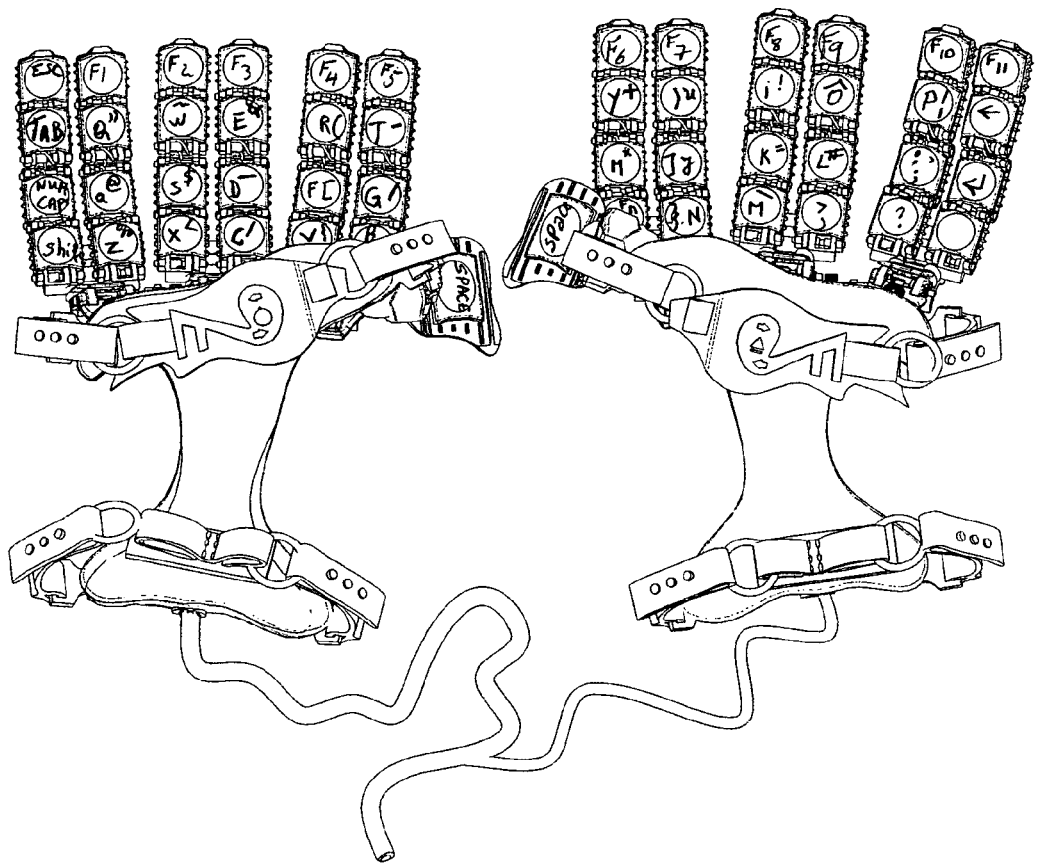
(FIG. 1) is a top view of both sides of the keyboard and mouse with an optional enumerated key layout.

This keyboard allows the operator to switch keys around enabling them to be able to use any keyboard layout, such as QWERTY and DVORAK. FIG. 1 is a preferred keyboard layout, where left symbols are on the left and right symbols are on the right and subtraction and division signs are on the left and addition and multiplication signs are on the right. The function and numeric keys are merged in a comprehensive manner. For example, by default the F1 key is F1 but to type the number 1 the operator would simply press the NUM LOCK key which would activate all of the numbers on the fingertip-like keys. In addition, special characters have been reassigned based on similarities. For example, the $ would now be on the S key due to their obvious similarities and the @ sign would now be on the A key. FIG. 1 has an example of the new location of special characters. This keyboard also has multi-media and programmable keys mounted on the straps (119).

Figure 6C:
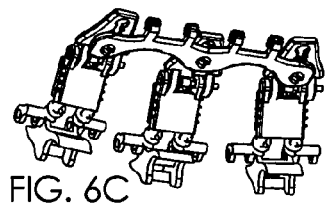
(FIG. 6C) is an isometric view of the fingerlike support units.
Figure 6D:
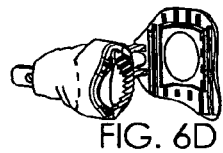
(FIG. 6D) is a top view of the left side mouse section.
Figure 6E:
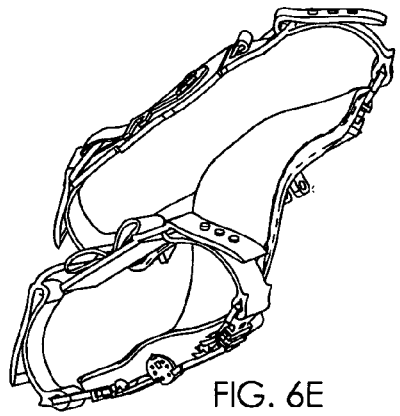
(FIG. 6E) is a lower back view of the left palm support.
Figure 6F:
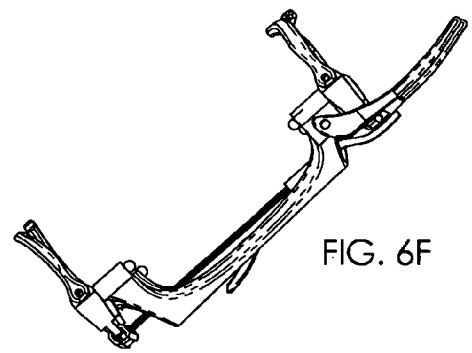
(FIG. 6F) is a side view of an arm support unit.
Figure 9C:
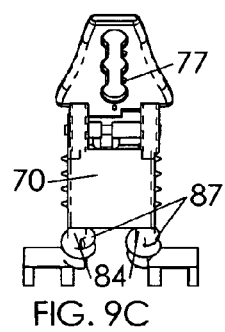
(FIG. 9C) is a back view of a fingerlike support unit.
Figure 9A:
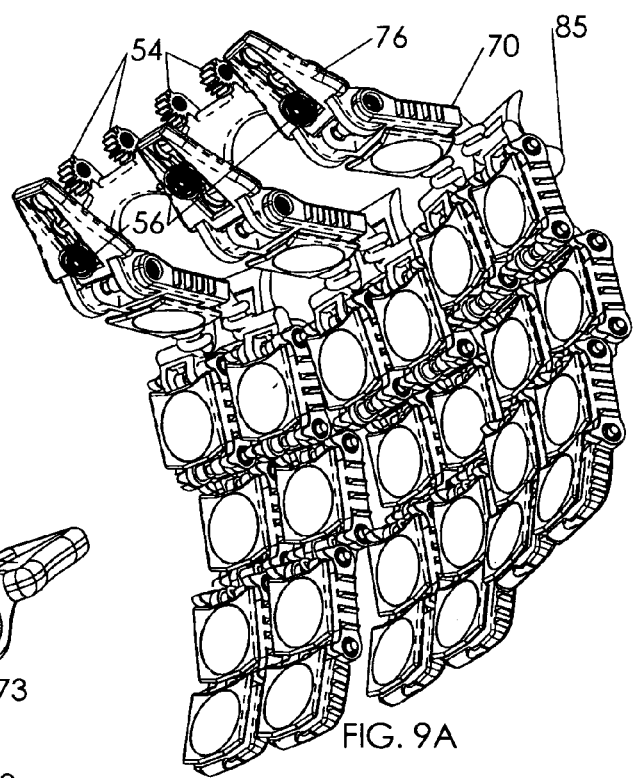
(FIG. 9A) is an isometric view of the fingerlike components and support bar.
Figure 9B:
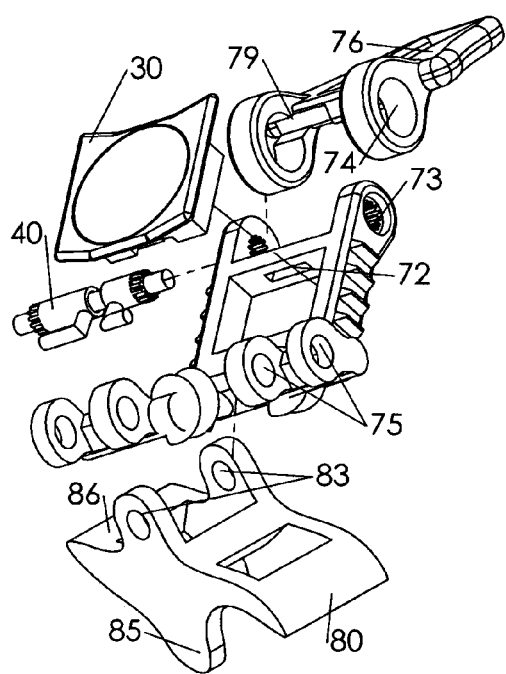
(FIG. 9B) is an exploded view of a fingerlike support unit.
Figure 9D:
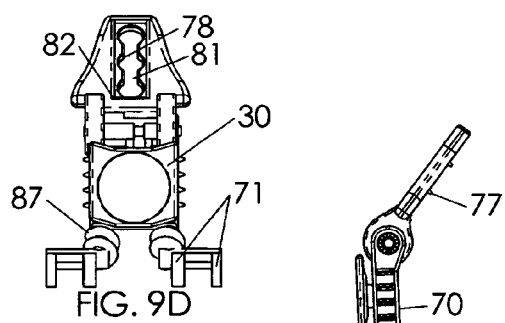
(FIG. 9D) is a front view of a fingerlike support unit.

The fingerlike components (FIG. 6B) are attached to the fingerlike support units (FIG. 6C), which are then attached to a palm support (FIG. 6E). The fingerlike support units work like a suspension for the fingerlike components. The three fingerlike support units (FIG. 6C) and a support bar (FIG. 6C) support the fingerlike components (FIG. 6B). Each fingerlike support unit supports a pair of fingerlike components, as in FIG. 9A. Three buttons with springs (FIG. 10B) are used to attach the fingerlike support units to the support bar (FIG. 10A). Each button includes a spring which provides resistance to the fingerlike support units. The springs, in conjunction with the rails, as in item 77 (FIG. 9C) and the extruded dots (53) on the bar support, prevent the fingerlike components from shifting arbitrarily. These three components work together providing a clicking sound when the operator rotates the fingerlike support components. Such a motion can be done using one or two fingers. Such a motion would further widen or narrow the space between fingerlike components and keys. Each fingerlike support can be extended or shortened by pressing on the buttons (56) with one finger and slide the fingerlike support up and down. When the operator presses on 56, 58 goes below 81 (FIG. 9D) allowing 78 to slide up and down. When the operator releases 56, 58 goes back up because of the spring (57) and locks at one of the holes (81). This also allows the operator to adjust the height of the keys.

The fingerlike support units are bendable. The upper section (76) is twisted on the self-lock-lever-gear unit, as in item 40 (FIG. 9B) via the holes (74), whereas 40 is also attached to the gear in the key base support (73). A spring is used to swing upward the lower section of the fingerlike support units. A bump (79) is used to stop the swing when it comes in contact with number 44. The operator can control how far the fingerlike components are bent by pressing on the edges (43) and twisting the lower section, which would twist 44 to a desired location. This allows the keyboard to be customized for big or small hands. The operator would simply release 43 at that location and the setting would remain locked until it is later re-customized. The bending feature of the fingerlike support unit also allows the fingerlike components to be closer or farther to the palm support.

The circuitry cables, as in item 87 (FIG. 9D) and other cables carrying lights to the keys travel from inside the palm support through the fingerlike support components (72), finally through each key unit, as in item 12 (FIG. 7D) and end at the fingertip-like components, as in item 16 (FIG. 7F). An electrical switch may be located in front of the palm support to be accessed easily with a fingertip, as in FIG. 10C. The switch (129) may have LIGHT/ON/OFF locations which will allow the operator to use the keyboard with or without lights and finally turn it off when the keyboard is not in use. When using the keyboards with lights, the keys may become brighter when being pressed. The cover of the palm support may be changeable with different colored plastic materials allowing the user to choose his or her favorite color. The light source inside the palm support may glow through the cover of the palm support when the user switches the keyboards on LIGHT.

Figure 2A:
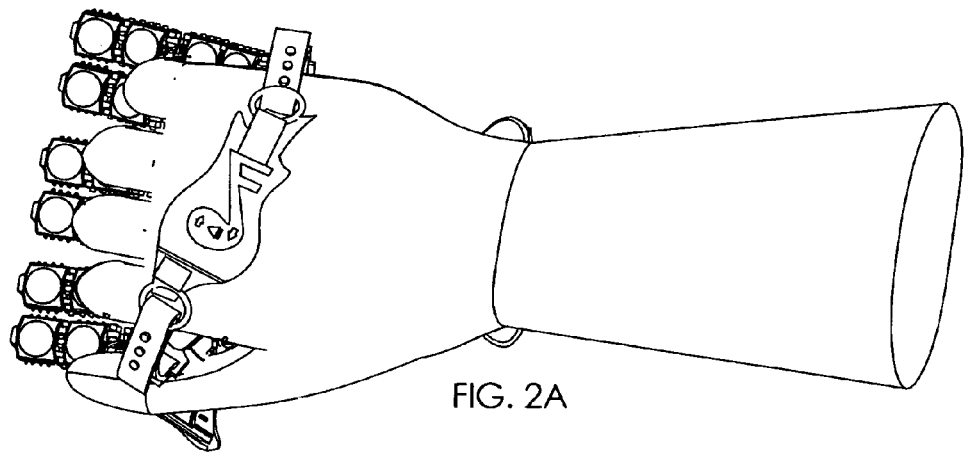
(FIG. 2A) is a top view of a right hand wearing and operating the right side keyboard.
Figure 2B:
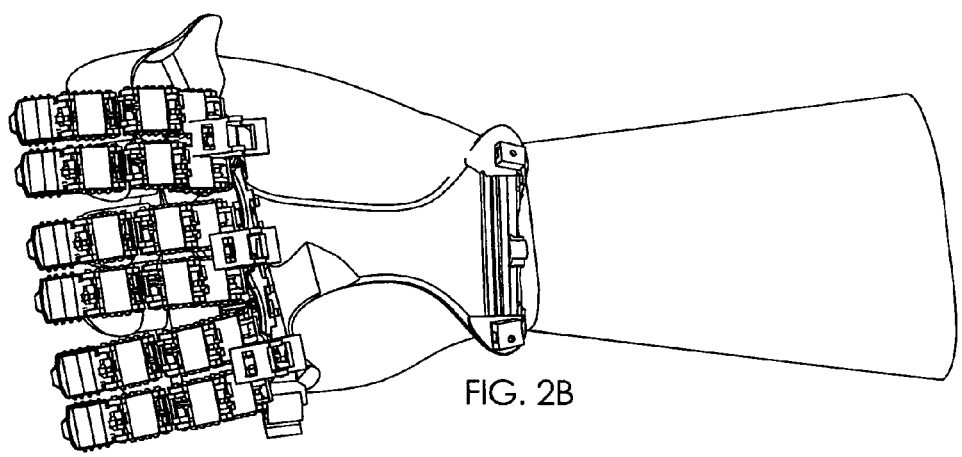
(FIG. 2B) is a bottom view of a right hand wearing and operating the right side keyboard.
Figure 2C:
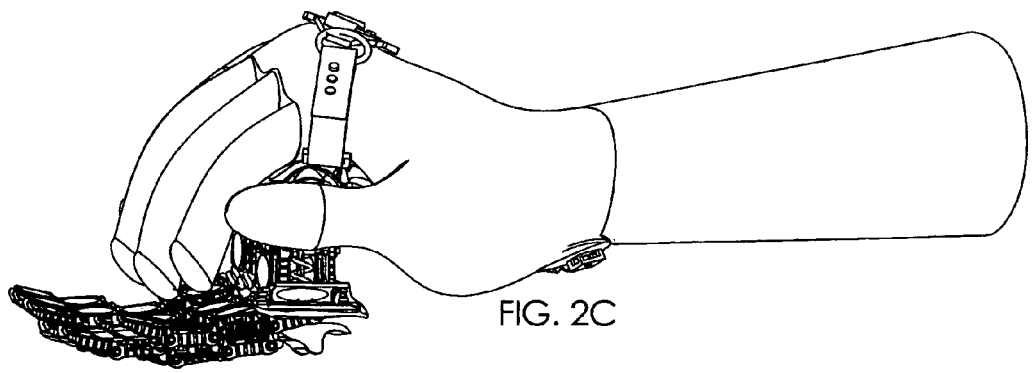
(FIG. 2C) is a side view of a right hand wearing and operating the right side keyboard.
Figure 3A:
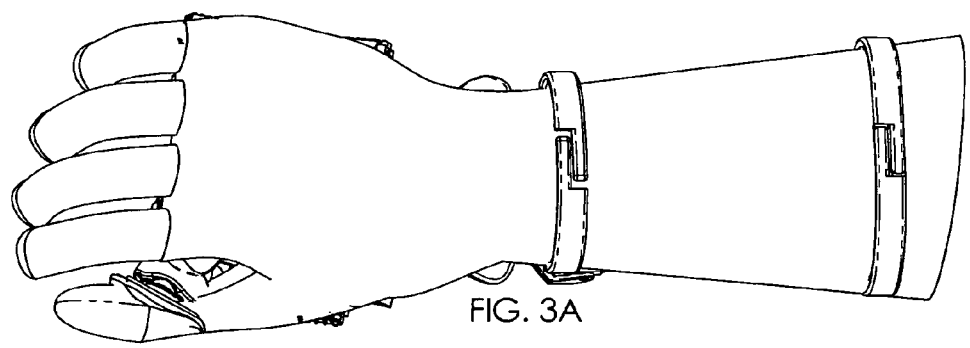
(FIG. 3A) is a top view of a right hand wearing the right side folded keyboard.
Figure 3B:
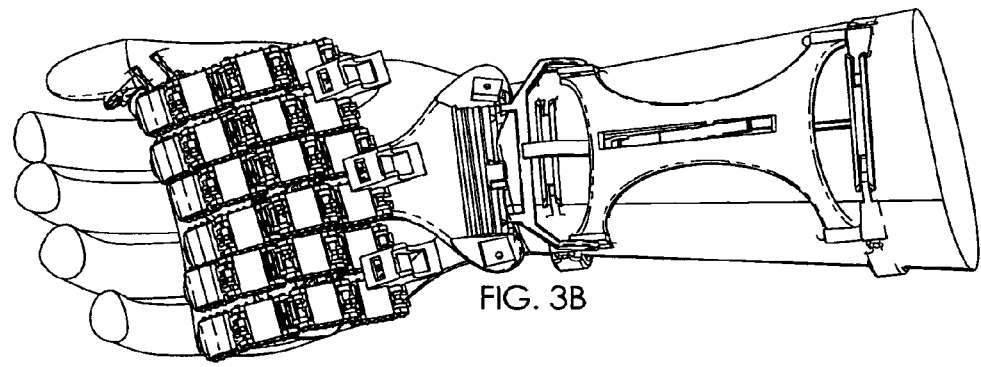
(FIG. 3B) is a bottom view of a right hand wearing the right side folded keyboard.
Figure 3C:
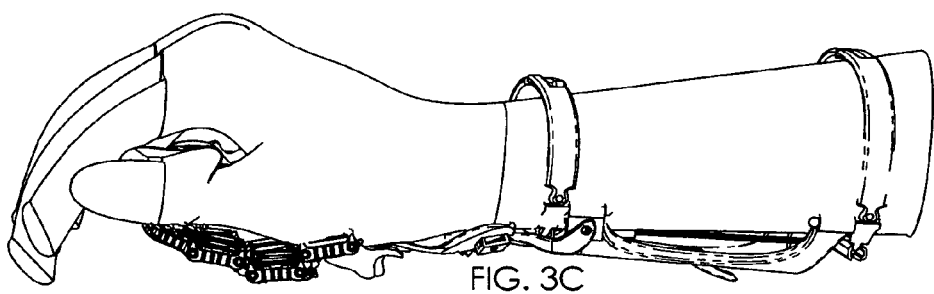
(FIG. 3C) is a side view of a right hand wearing the right side folded keyboard.
Figure 9E:
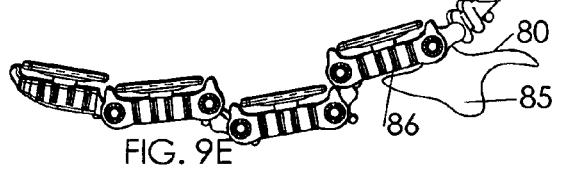
(FIG. 9E) is a side view of a fingerlike component connected to its support unit.
Figure 17A:
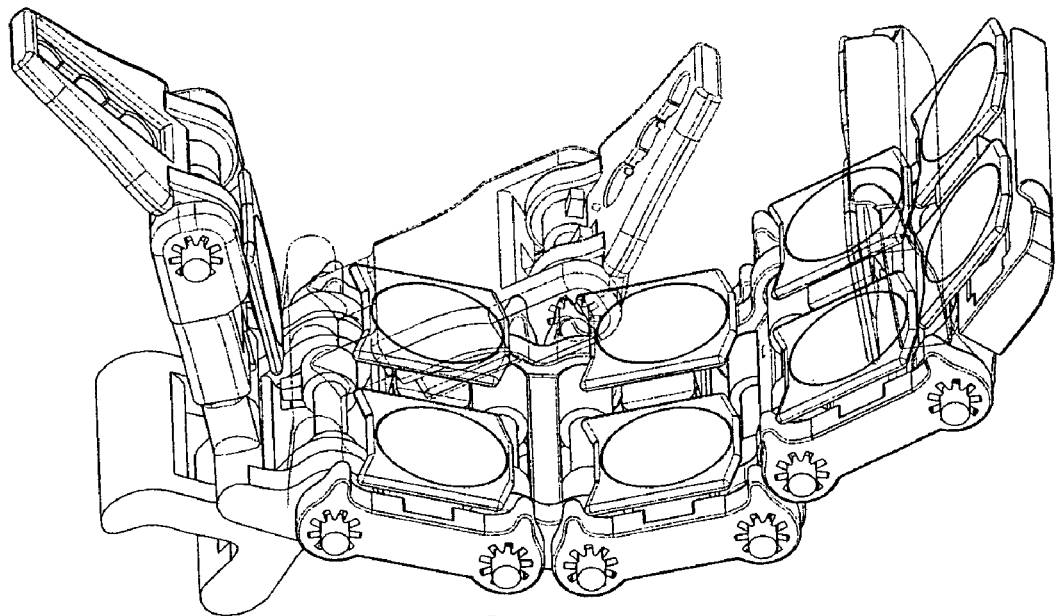
(FIG. 17A) is an alternate view of sets of keys mounted on a fingerlike component.
Figure 17B:
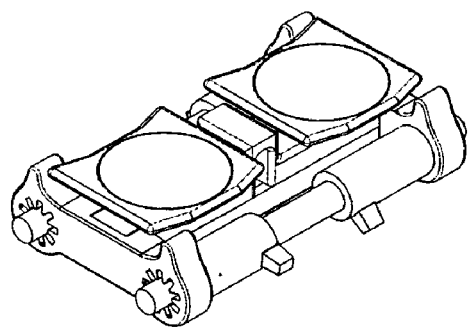
(FIG. 17B) is an isometric view of a set of keys mounted on one key unit.
Figure 17C:
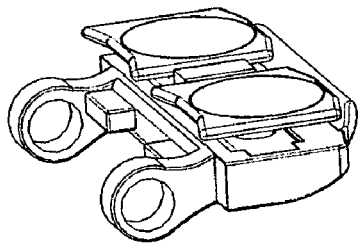
(FIG. 17C) is an isometric view of a set of keys mounted on one key unit located at the end of a fingerlike component.
Figure 18A:
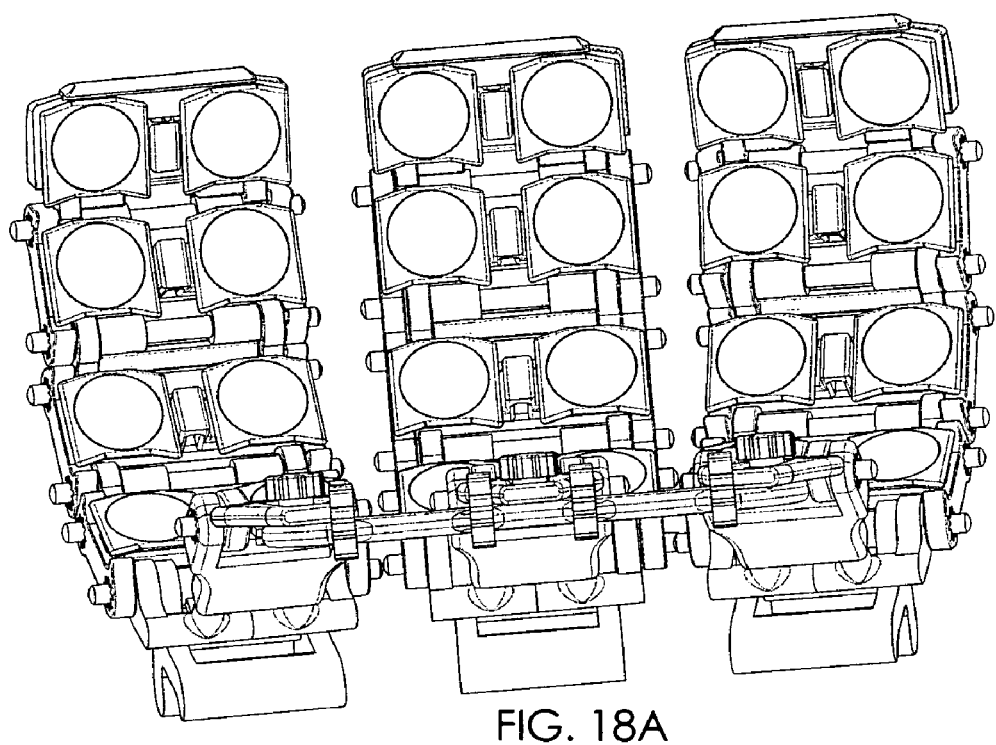
(FIG. 18A) is a top view of 3 fingerlike components.
Figure 18B:
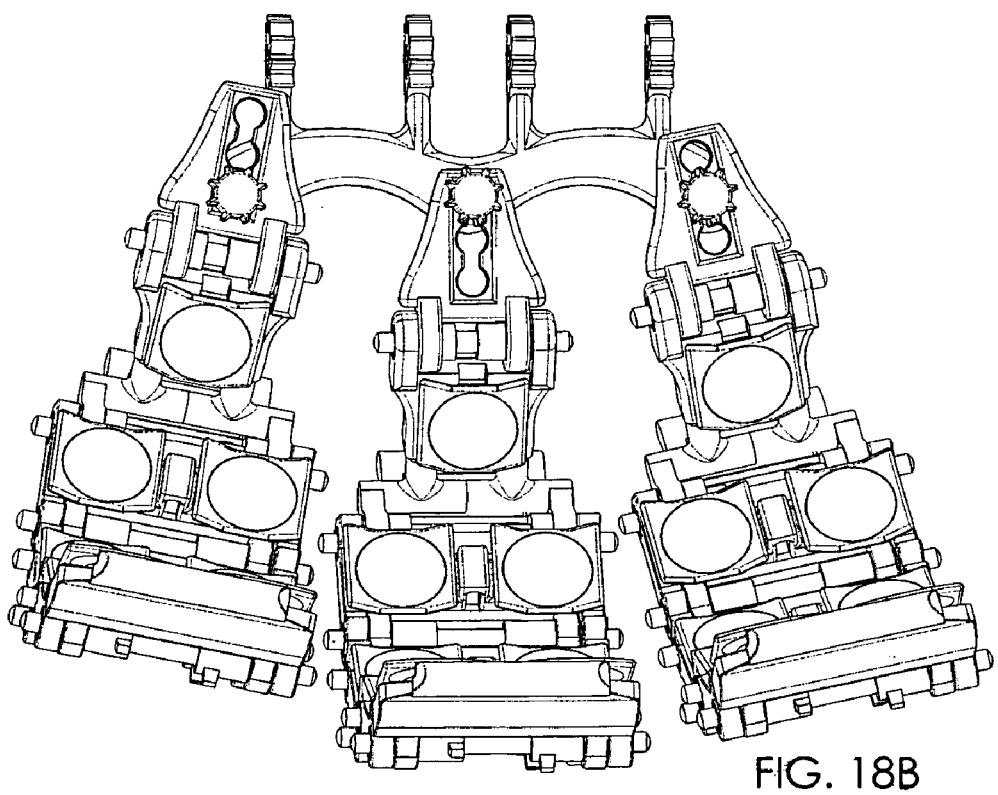
(FIG. 18B) is a front view of 3 fingerlike components.

The lower section of the fingerlike support units (70) houses command keys (30) and can be split in order to support two fingerlike components. The fingerlike support units may be split to support one or more fingerlike components. Each fingerlike component may be made of one or more key units. Each key unit may be made to hold more than one key as in FIG. 17B and FIG. 18A. Each fingerlike component (FIG. 8A) is attached to 71 using a self-lock-lever-gear unit or any other component like unto it. Item 83 is attached to each inner support hole (75) of the split support unit and 40 to keep the keyboard afloat while being used on a surface. Item 85 serves as an anti-friction component to keep the keyboard/mouse from slipping. The palm support component and the palm of the operator press on number 80 (FIG. 9E) which swings around 83 to push 86 upward. Number 86 would then push the fingerlike components to swing them shut (FIG. 3C and FIG. 3B). These motions allow the keyboard/mouse to fold and hide inside of the user's hands, leaving the fingers free. To achieve this, the fingertips of the operator can simply be extended to reach the fingertip-like components, and press them inward. The fingerlike components, the fingerlike support components, and the palm support components will fold themselves (FIG. 5C). The locking mechanism (127) will be pushed by a spring to the edges (54) to lock the keyboard in a folded position. FIG. 10C is a detailed view of these components. The operator can simply push on a button (126) which swings around, as in item 128 (FIG. 10D) and item 107 (FIG. 11C) to lift 127 (FIG. 10D) and release the support bar (FIG. 10A) that holds all the fingerlike components. The operator can change the keyboard settings from FIG. 3C to FIG. 2C by pushing on a button (126) with a fingertip.

Figure 5A:
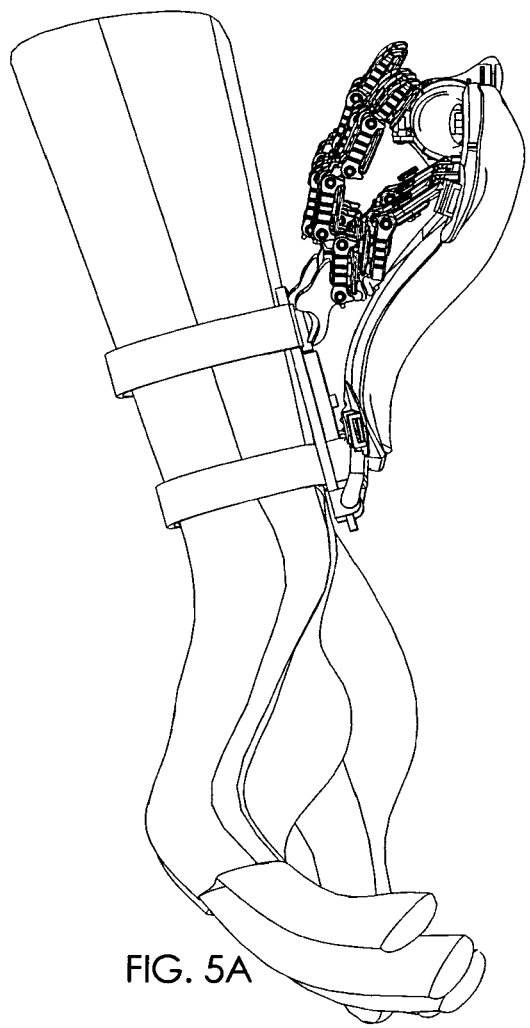
(FIG. 5A) is a side view of the left side keyboard folded to the arm support unit.
Figure 5B:
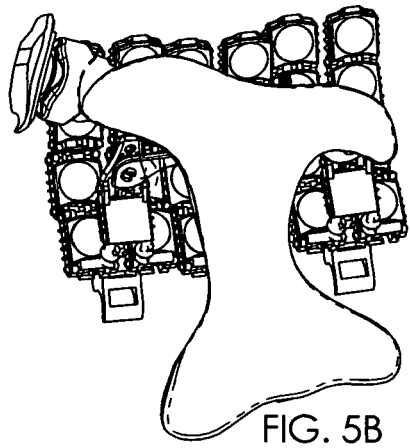
(FIG. 5B) is a top view of a folded right side keyboard.
Figure 5C:
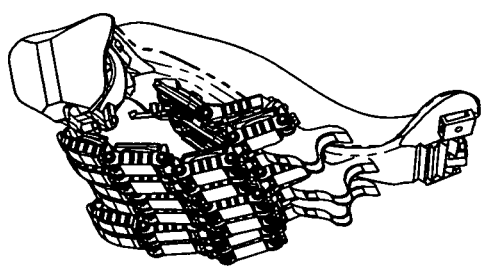
(FIG. 5C) is a side view of a folded right side keyboard.
Figure 5E:
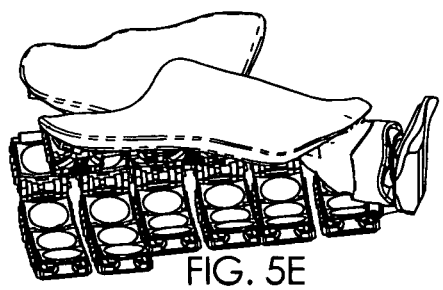
(FIG. 5E) is a front view of a folded right side keyboard.
Figure 5D:
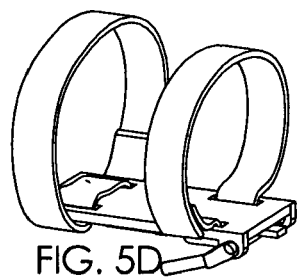
(FIG. 5D) is an isometric view of an arm support unit for the keyboard.
Figure 14A:
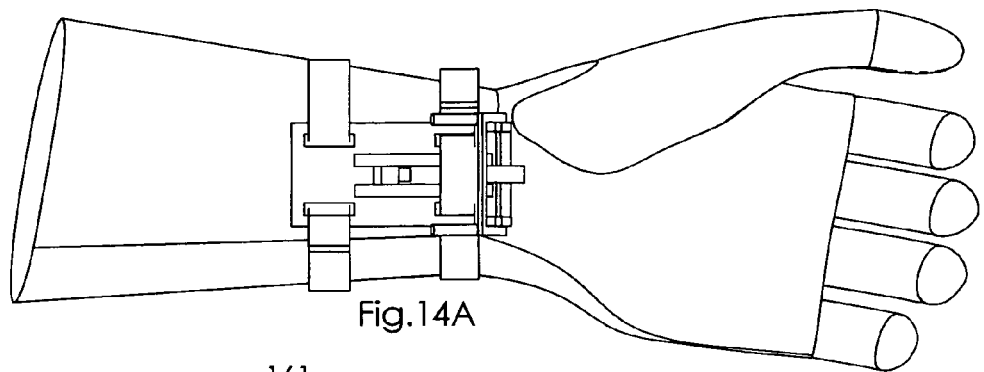
(FIG. 14A) is a right hand wearing a different arm support unit for the keyboard.
Figure 14B:
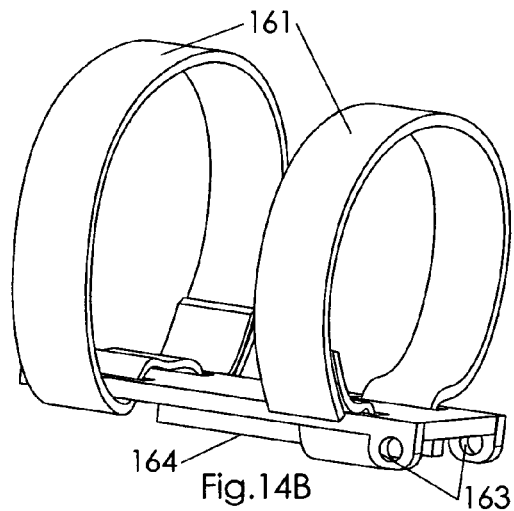
(FIG. 14B) is an isometric view of the base of an arm support unit for the keyboard.
Figure 14C:
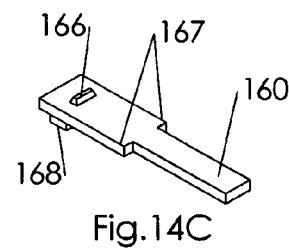
(FIG. 14C) is an isometric view of A lock for the arm support unit.
Figure 14D:
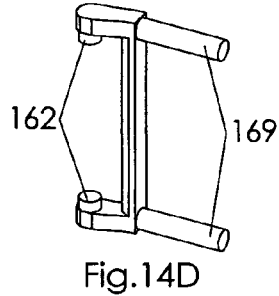
(FIG. 14D) is an isometric view of the fork lift component for the arm support unit.
Figure 14E:
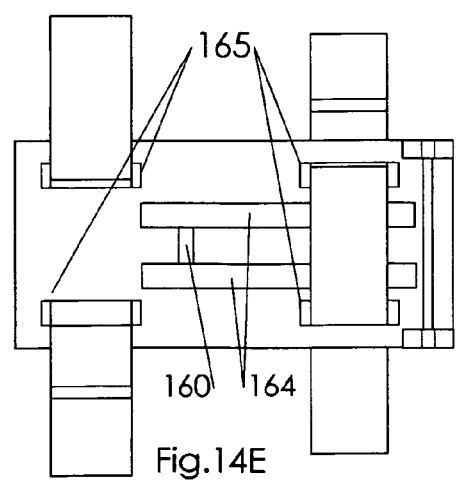

The keyboard may also be attached to an arm support unit, which would allow the hands of the operator to be free both when using the keyboard and after, when the keyboard is folded back, as in FIG. 5A. For example, a soldier can wear the keyboard attached to their arms and still have their hands free to operate their weapon. FIG. 14A is a bottom view of a right hand wearing an arm support. The arm support is made of a simple plate with holes, as in item 165 (FIG. 14E) where the straps (161) go through the plate, as in FIG. 14B. Two rails (164) are mounted on the bottom of the plate to facilitate the sliding movement of the closing mechanism (FIG. 14C). The edges (167) slide in-between the rails (164). The edges (167) are stopped at the ends of the rails (164). A bump (166) is on the locking mechanism (FIG. 14C) allowing it to grasp with the corresponding indentation (160) to keep it steady in a locked position. Multiple indentations may be used to allow the locking mechanism to click at different lengths. The protrusion (168) facilitates the operator to slide the locking mechanism in and out. The hooks (162) of FIG. 14D are attached to 163 of the base. The protrusions (169) are then used to attach to the palm support at 115.

Figure 13A:
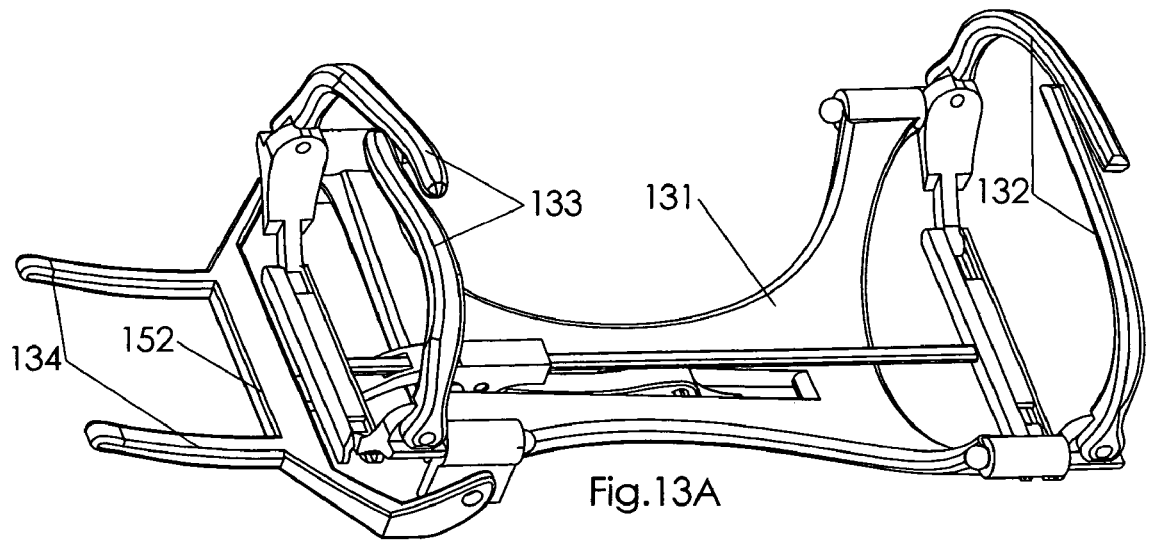
(FIG. 13A) is an isometric view of an arm support unit.
Figure 13B:
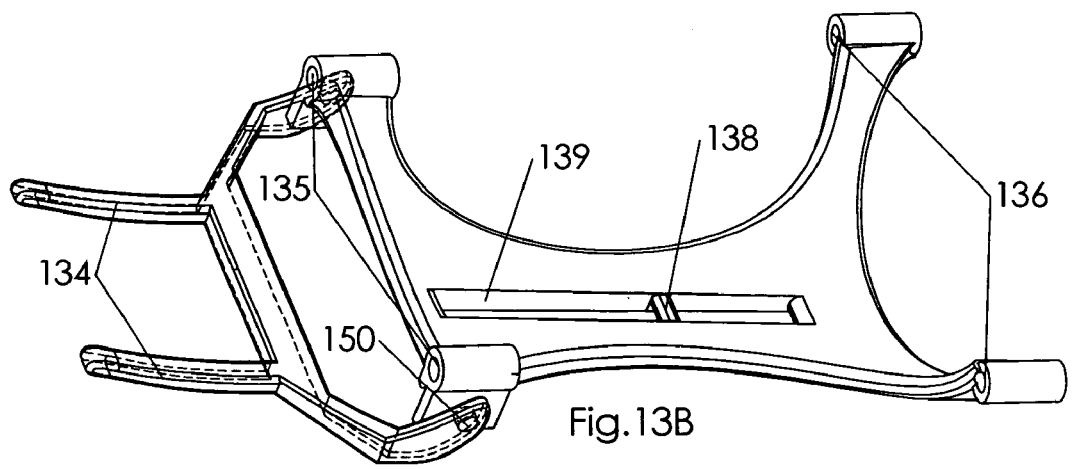
(FIG. 13B) is an isometric view of the base support of the arm support unit.
Figure 13C:
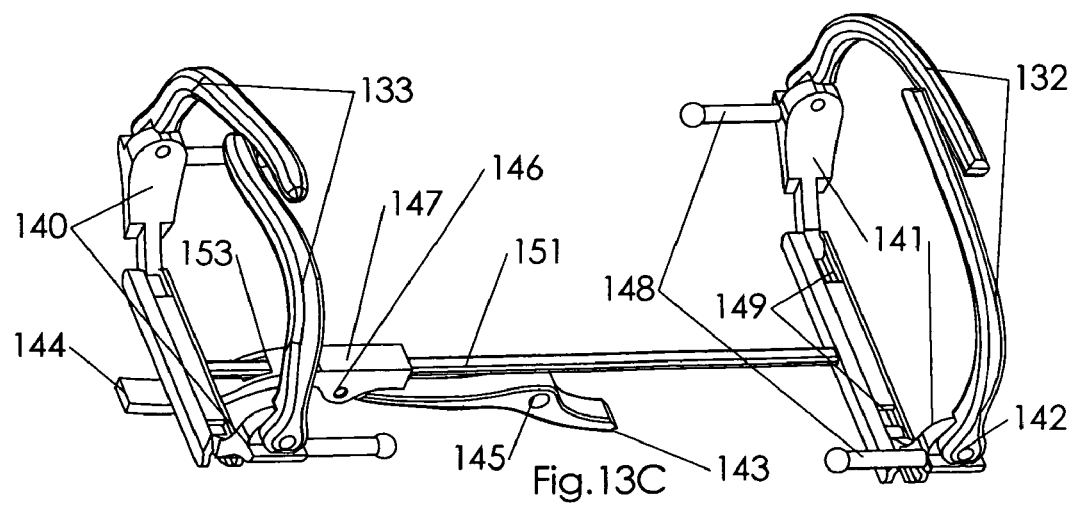
(FIG. 13C) is an isometric view of the strap mechanism of the arm support unit.
Figure 15A:
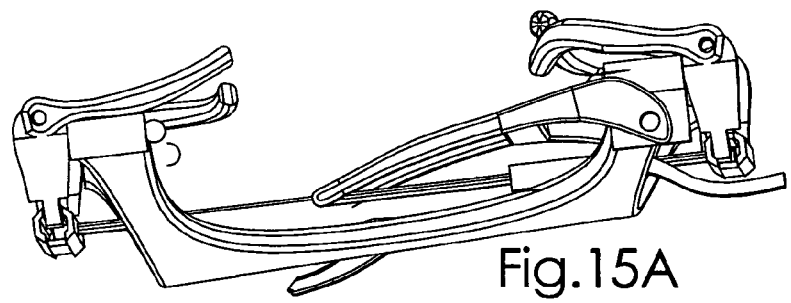
(FIG. 15A) is a side view of a folded arm support unit.
Figure 15B:
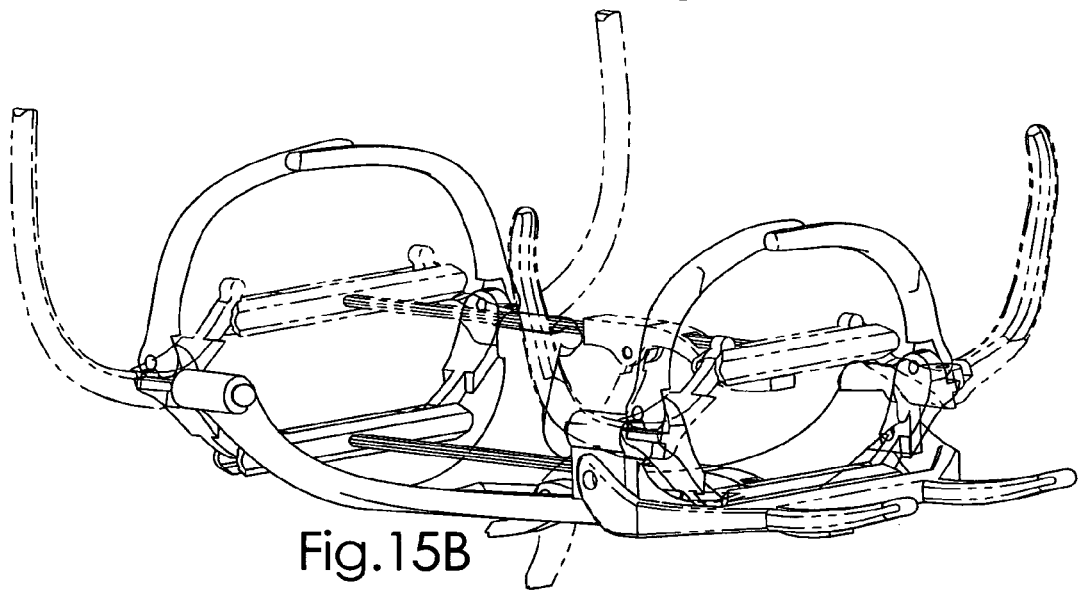
(FIG. 15B) is an alternate position view of an arm support unit.
Figure 15C:
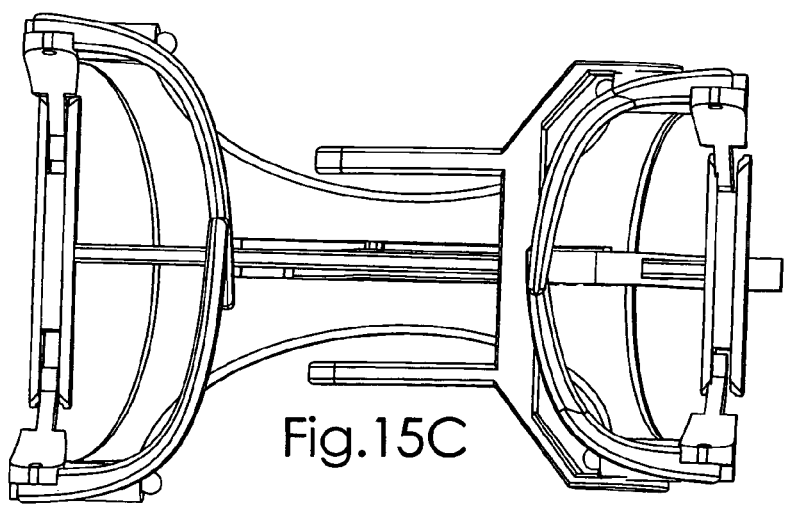
(FIG. 15C) is a top view of a folded arm support unit.

FIG. 13A is a strapless arm grip which allows the operator to wear the keyboard/mouse without using straps. The operator would simply press their forearms against the arm grip or vice versa, and the grips (132,133) would just snap into place, as in FIG. 3C. The arm grip is made of a base component, as in item 131 (FIG. 13A) which is attached to a lifting fork component (134). The base of the arm grip (131) has a hook (138) and holes (139) that allow the release mechanism (143) to work. The base (131) also has hooks (135 and 136) which secure item 148 in position. Two extrusions on both inner sides of the fork lift mechanism are inserted in the hole at each side of the base component, as in item 150 (FIG. 13B), which allow these two components to rotate freely. The release mechanism (143) is attached (rotating) to a hole (146) of the locking mechanism (147) that travels along the path (151) of a T component, as in FIG. 13C. The hole (153) allows the locking mechanism to slide and remain attached to the T bar (151). A hole (145) from the release mechanism is attached to item 138 allowing it (143) to rotate freely. The head (144) of the locking mechanism locks the bar (152) of the fork lift mechanism in a closed position. The lower parts (140 and 141) of the grip (132 and 133) go in and out of the T head (149) when the operator closes and opens the arm grips. The upper parts (132 and 133) of the arm grip can be twisted at the hole (142) allowing them to fold, as in FIG. 15A. The head (144) goes inward when the operator presses on the release button (143) allowing the fork lift mechanism to rotate downward freely. Therefore, the palm support holes (115) that are attached to the fork lift mechanism (134) can be rotated to fold the keyboard/mouse to rest at the bottom of the arm grip base (131). This allows the hands of the operator to be free while the keyboard is folded to the operator's forearm.

SUMMARY

This keyboard/mouse is designed to be worn just like a pair of gloves. However, the operator can put on the keyboard/mouse easier than a pair of gloves. The operator can fold the keyboard/mouse with the same hand that is wearing the keyboard/mouse. The operator can conceal the keyboard while wearing it and the keyboard/mouse can be used while the hands are in the pocket of the operator. Additional features such as being rugged, water resistant, wireless or cabled with USB or PS2, lit keys and a stylish look can be added. This keyboard was designed to be used by anyone, including, civilians, scientists and army personnel.

No hand movement is required while using this keyboard/mouse. The operator can adjust the distance between keys both horizontally and vertically. This keyboard/mouse allows you to spread your fingers while resting your hands on a palm support, surfing the internet or typing. With just two fingers the operator of this keyboard/mouse can adjust every component to a desired setting, which will remain locked for later use. The operator can fold the keyboard/mouse; slide them in his or her pocket when not in use. The operator will be able to bring back all preset settings with the push of a button. This keyboard/mouse can be used while running or sitting down. There are almost no restrictions on how and when the operator can use it. The keys can be brought close or far from each other in order to allow the operator with small or big fingers to easily use the keyboard.

Preferred embodiments have been described for this invention although modifications may occur. Further alterations and modifications fall within the scope of the mentioned claims or equivalents thereof.

I claim:

1. A wearable adjustable ergonomic data input and curser-pointing device having two substantially similar sections, each section comprising:
   a palm support unit; and
   a plurality of finger-like components extending from the palm support unit and disposed to be accessible to fingers of a hand placed in the palm support unit; and
   Wherein each said finger-like component is arranged to house plural interconnected key units extending along an axis of said finger-like component, one of said key units being adapted, upon activation, for input of alphanumeric characters or of pre-programmed action to an information processing device; and
   wherein each key unit comprises:
   a key base;
   a base cover; and a key top;

and further wherein spacing among key units in a given finger-like component is adjustable in at least two dimensions via a self lock lever gear knob or a connecting device concentrically applied as a rotary transmission gear means mounted so as to interconnect a given key unit base and an adjacent key joint component; and wherein the position or angle of the key unit is determined when a user presses a button located on two edges of the self lock lever gear knob or the connecting device and twists the self lock lever gear knob or the connecting device while holding down the button so as to move the key unit to a desired location; as the self lock lever gear knob or a connecting device twists, a hook protrusion found on a surface of the self lock lever gear knob or the connecting device is moved to the desired location, once the user releases the button at the desired location, the self lock lever gear knob or the connecting device locks the key unit in the desired location.

2. The wearable data input device according to claim 1, wherein each side of the device can communicate to an electronic information processing unit wirelessly or via a cable.

3. The wearable data input device according to claim 1, wherein spacing among keys mounted in said key units are adjustable in three dimensions.

4. The wearable data input device according to claim 1, wherein each key unit is attached to another one either directly or via a joint along an axis of ones of said finger-like components, and wherein spatial adjustment of said key units is made via said attachments.

5. The wearable data input device according to claim 1, wherein the palm support unit is curved to ergonomically fit an operator's palm.

6. The wearable data input device according to claim 1, wherein the palm support unit also houses electronic components.

7. The wearable data input device according to claim 1, wherein the palm support unit houses a light source to illuminate keys in said key units.

8. The wearable data input device according to claim 1, wherein the palm support is attached to an adjustable thumb support.

9. The wearable data input device according to claim 8, wherein the thumb support unit is adjustably attached to the palm support unit, adjacently to a forefinger position of an operator.

10. The wearable data input device according to claim 8, wherein the thumb support houses a cursor pointing device and can also house command keys.

11. The wearable data input device according to claim 10, wherein the thumb support unit housing the cursor pointing device and command keys can be folded or form a shield for one another.

12. The wearable data input device according to claim 1, wherein the palm support further includes hooks for connecting to arm support units or straps, said arm support units being adapted to also house command keys.

13. The wearable data input device according to claim 1, wherein the key units can be folded onto the palm support unit.

14. The wearable data input device according to claim 13, wherein a lever mechanism can be used as means to lock or release the key units and finger-like components from a folding position to being spread to a working position.

15. The wearable data input device according to claim 1, wherein the self lock lever gear knob includes spring mechanisms to provide pressure to the attached components.

16. The wearable data input device according to claim 1, wherein the self lock lever gear knob includes locking mechanisms to stop the attached components to a desired position.

17. The wearable data input device according to claim 1 further including an arm support unit attached to the palm support unit.

* * * * *